UNITED STATES PATENT OFFICE.

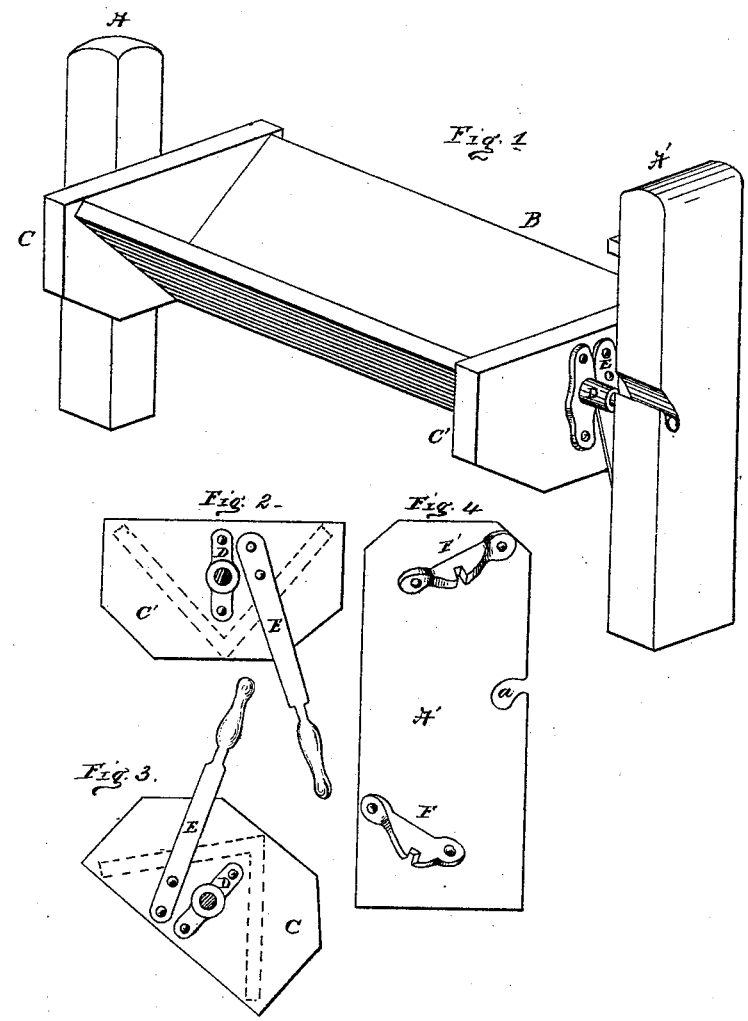

DAVID SLAUGHTER, OF MOUNTVILLE, PENNSYLVANIA.

IMPROVEMENT IN ROTATING CATTLE-TROUGHS.

Specification forming part of Letters Patent No. 149,349, dated April 7, 1874; application filed March 6, 1874.

*To all whom it may concern:*

Be it known that I, DAVID SLAUGHTER, of Mountville, in the county of Lancaster and State of Pennsylvania, have invented certain Improvements on Revolving Water-Troughs, of which the following is a specification:

The object of this invention is to supply the wants of many farmers who use the ordinary lifting-pumps and water-troughs, especially in barn-yards, for watering cattle; and is to prevent dust, leaves, straw, &c., from lodging and fouling the trough during summer, and from being clogged up with snow or ice during the winter season, besides preserving the trough and keeping it always clean.

The accompanying drawings, with the letters of reference marked thereon, and a brief explanation, will enable any one to make and use the same, in which—

Figure 1 is a perspective view of a triangular trough, hung on pivot-bearings between two posts. Fig. 2 is an end view, to show the pivot and spring-lever attached; Fig. 3, the same when reversed and sheltered; Fig. 4, the inner face of one of the posts, with its catch or latch plates.

Fig. 1 represents a triangular wooden trough, B, having end pieces C C', and a plate with a spindle or pivot, D, in each, by which it is held in bearings in the posts A A', to turn between. An open slotted bearing, *a*, is shown on the edge of the post A', so that the trough may be lifted out from between the posts, if desirable; but ordinary posts can be used, and adjusted in the setting. In such case, a foot-brace may be added, on which to affix the lower catch F. On the end C' is shown a spring or latch lever, E, affixed. This is used for turning the trough, and made to lock and prevent turning, when in the desired position, by either the use of the lower catch or notched plate F or the upper F'. These plates are secured to the inner face of the post A', and shown by Fig. 4. Thus while watering cattle the lever is secured below. The position of the trough is shown by the dotted lines, Fig. 2. When no longer wanted, the lever is detached from the lower catch, and secured in the upper, which brings the trough as shown by the dotted lines in Fig. 3, when it drains out perfectly and is sheltered, keeping it clean and dry, and tends greatly in the preservation of the trough, the health of the cattle, and saves frequent cleaning or annoyance from snow and ice.

It is so simple and cheap, and easily operated without loss of time, that, as a whole, it is considered both novel and highly useful.

I am not aware that the combination and arrangement shown have ever been known or used substantially like it; therefore,

What I claim, and desire to secure in a revolving water-trough for farm use, is—

In combination with the posts A A', having a slot, *a*, and the trough B, the pivot attachment D, spring or lever latch E, and also the catch-plates F' F on the post, the whole constructed and operated substantially as and for the purpose herein mentioned.

DAVID SLAUGHTER.

Witnesses:
 WM. B. WILEY,
 JACOB STAUFFER.